(12) United States Patent
Aso

(10) Patent No.: US 7,589,980 B2
(45) Date of Patent: Sep. 15, 2009

(54) DC-DC CONVERTER

(75) Inventor: Shinji Aso, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 0 days.

(21) Appl. No.: 12/100,765

(22) Filed: Apr. 10, 2008

(65) Prior Publication Data

US 2008/0285311 A1 Nov. 20, 2008

(30) Foreign Application Priority Data

May 18, 2007 (JP) .............................. 2007-132705

(51) Int. Cl.
*H02M 3/335* (2006.01)
*H02M 3/24* (2006.01)
*H02M 7/5387* (2006.01)

(52) U.S. Cl. ............................ 363/17; 363/98; 363/132

(58) Field of Classification Search ................... 363/16, 363/17, 21.01, 21.02, 21.04, 97, 98, 131, 363/132
See application file for complete search history.

(56) References Cited

U.S. PATENT DOCUMENTS

| 5,754,413 A | * | 5/1998 | Fraidlin et al. | 363/16 |
| 6,064,580 A | * | 5/2000 | Watanabe et al. | 363/17 |
| 6,567,285 B2 | * | 5/2003 | Cho et al. | 363/132 |
| 7,446,512 B2 | * | 11/2008 | Nishihara et al. | 323/233 |
| 7,466,565 B2 | * | 12/2008 | Tanaka | 363/16 |

FOREIGN PATENT DOCUMENTS

JP  2003-319650  11/2003

OTHER PUBLICATIONS

U.S. Appl. No. 11/864,045, filed Sep. 28, 2007, Aso.

* cited by examiner

*Primary Examiner*—Matthew V Nguyen
(74) *Attorney, Agent, or Firm*—Oblon, Spivak, McClelland, Maier & Neustadt, L.L.P.

(57) ABSTRACT

In a DC-DC converter of the present invention, a converting circuit converts a DC-DC voltage outputted from a DC power supply into an AC voltage, and to output to a series circuit in which a primary winding of a first transformer, a first reactor, and a current resonance capacitor are connected to one another in series. A primary winding of a second transformer, a primary winding of a third transformer, and a second reactor constitute a closed loop. A secondary winding of the second transformer and a secondary winding of the third transformer are connected in series to both ends of a secondary winding of the first transformer. A first rectifying/smoothing circuit rectifies and smoothes a voltage of the secondary winding of the second transformer. A second rectifying/smoothing circuit rectifies and smoothes a voltage of the secondary winding of the third transformer.

10 Claims, 8 Drawing Sheets

DC-DC CONVERTER

BACKGROUND OF THE INVENTION

1. Field of the Invention

The present invention relates to a highly efficient, small-sized, low-cost DC-DC converter.

2. Description of the Related Art

FIG. 1 is a circuit diagram of a single-output DC-DC converter that is a basic circuit for explaining a conventional multiple-output DC-DC converter.

The DC-DC converter shown in FIG. 1 is disclosed in Japanese Patent Application Publication No. 2003-319650, and is configured of a half-bridge circuit. In the circuit, the two sides of a DC power supply Vin are connected to a series circuit in which a switching element Q1 made of a metal oxide semiconductor field-effect transistor (MOSFET) and a switching element Q2 made of a MOSFET are connected in series. The drain terminal of the switching element Q2 is connected to the positive electrode of the DC power supply Vin, whereas the source terminal of the switching element Q1 is connected to the negative electrode of the DC power supply Vin.

Between the drain terminal and source terminal of the switching element Q1, a diode D1 and a voltage resonance capacitor Crv are connected in parallel, while a reactor Lr1, the primary winding P1 of a transformer T1, and a current resonance capacitor Cri are connected as a series circuit. The reactor Lr1 is configured of a leakage inductance between the primary winding and the secondary winding of the transformer T1. An exciting inductance, as a reactor Lp1, is equivalently connected to the primary winding P1. A diode D2 is connected in parallel between the drain terminal and source terminal of the switching element Q2.

A starting point of each winding of the transformer T1 is denoted by a dot (●). The anode of a diode D3 is connected to one end (● side) of the secondary winding S1 of the transformer T1. The other end of the secondary winding S1 of the transformer T1 and one end (● side) of a secondary winding S2 of the transformer T1 are connected to one end of a smoothing capacitor Co1. The other end of the secondary winding S2 of the transformer T1 is connected to the anode of a diode D4. The cathode of the diode D3 and the cathode of the diode D4 are connected to the other end of the capacitor Co1. A load Ro1 is connected to the both ends of the capacitor Co1.

On the basis of an output voltage Vo from the capacitor Co1, a control circuit 10 performs pulse-frequency-modulation (PFM) control (frequency control) by alternately turning on and off the switching elements Q1 and Q2 so that the output voltage V0 of the capacitor Co1 can be kept constant.

Detailed descriptions will be provided next for how a conventional DC-DC converter with the above configuration operates, with reference to a timing chart shown in FIG. 2.

In FIG. 2, VQ1 denotes the voltage between the drain terminal and source terminal of the switching element Q1; IQ1 denotes the drain terminal current of the switching element Q1; VQ2 denotes the voltage between the drain terminal and source terminal of the switching element Q2; IQ2 denotes the drain terminal current of the switching element Q2; VCri denotes the voltage between the two terminals of the current resonance capacitor Cri; VD3 denotes the voltage between the two terminals of the diode D3; ID3 denotes the current of the diode D3; VD4 denotes the voltage between the two terminals of the diode D4; and ID4 denotes the current of the diode D4.

It should be noted that: each of the switching elements Q1 and Q2 has a dead time for which the switching element is off; and the switching elements Q1 and Q2 alternately are turned on and off.

First of all, during time t0 to time t1, the switching element Q2 is turned from on to off at time t0. While the switching element Q2 is on, a current flows through Vin, Q2, Lr1, Lp1, Cri to Vin on the primary winding side of the transformer T1. A current flows through Co1, Ro1 to Co1 on the secondary winding side of the transformer T.

Once the switching element Q2 is turned off, the current which flows on the primary wiring side of the transformer T1 is commutated from the switching element Q2 to the voltage resonance capacitor Crv, and thus flows through Crv, Lr1, Lp1, Cri to Crv.

As a result, the voltage of the voltage resonance capacitor Crv is discharged down to zero volts, although being almost equal to the voltage of the direct voltage supply Vin while the switching element Q2 is turned on. Hereinafter, the voltage of the DC power supply Vin will also be denoted by the reference numeral Vin.

Accordingly, because the voltage of the voltage resonance capacitor Crv is equal to the voltage VQ1 of the switching element Q1, the voltage VQ1 of the switching element Q1 decreases from Vin to zero volts. In addition, because the voltage VQ2 of the switching element Q2 is expressed by (Vin−VQ1), the voltage VQ2 increases from zero volts to Vin.

During time t1 to time t2, once the voltage of the voltage resonance capacitor Crv decreases to zero volts at time t1, the diode D1 becomes conductive, and the current thus flows through D1, Lr1, Lp1 (P1), Cri to D1. In addition, the voltage of the secondary winding S2 of the transformer T1 reaches the output voltage Vo, and a current flows through Co1, Ro1 to Co1, whereas a current flows through S2, D4, Co1 to S2, on the secondary winding side of the transformer T1. Furthermore, when the gate terminal signal of the switching element Q1 is turned on during time t1 to time t2, the switching element Q1 is brought into a zero-voltage switching (ZVS) operation and a zero-current switching (ZCS) operation.

During time t2 to time t3, because the switching element Q1 is turned on at time t2, a current flows through Cri, Lp1 (P1), Lr1, Q1 to Cri, and the voltage Cri of the current resonance capacitor Cri decreases. In addition, on the secondary winding side of the transformer T1, a current flows through S2, D4, Co1 to S2, whereas a current also flows through Co1, Ro1 to Co1. The voltage of the secondary winding S2 is clamped by the voltage of the output voltage Vo, whereas the voltage of the primary winding P1 is clamped by a voltage obtained by multiplying the output voltage Vo by the turns ratio. As a result, a resonance current generated by the reactor Lr1 and the current resonance capacitor Cri, flows on the primary side of the transformer T1.

During time t3 to time t4, the voltage of the secondary winding S2 decreases below the output voltage Vo, and no current flows on the secondary winding side of the transformer T1. On the secondary winding side of the transformer T1, the current flows through Co1, Ro1 to Co1. In addition, on the primary winding side of the transformer T1, the current flows through Cri, Lp1, Lr1, Q1 to Cri, while on the primary winding side of the transformer T1, a resonance current generated by the sum (Lr1+Lp1) of the two reactors Lr1 and Lp1 as well as the current resonance capacitor Cri flows.

During time t4 to time t5, once the switching element Q1 is turned off at time t4, the current which has flown on the primary winding side of the transformer T1 is commutated from the switching element Q1 to the voltage resonance capacitor Crv, and a current flows through Lp1, Lr1, Crv, Lp1.

As a result, the voltage of the voltage resonance capacitor Crv, which has been almost equal to zero volts while the switching element Q1 is turned on, is charged up to Vin. Because the voltage of the voltage resonance capacitor Crv is equal to the voltage VQ1 of the switching element Q1, the voltage VQ1 of the switching element Q1 increases from zero volts to Vin. In addition, because the voltage VQ2 of the switching element Q2 is equal to (Vin−VQ1), the voltage VQ2 of the switching element Q2 decreases from Vin to zero volts.

During time t5 to time t6, once the voltage of the voltage resonance capacitor Crv increases up to Vin at time t5, the diode D2 becomes conductive, and a current flows through Lp1 (P1), Lr1, D2, Vin, Cri to Lp1 (P1). In addition, the voltage of the secondary winding S1 of the transformer T1 reaches the output voltage Vo, and the current flows through Co1, Ro1 to Co1, whereas a current flows through S1, D3, Co1 to S1, on the secondary winding side of the transformer T1. Furthermore, when the gate terminal signal of the switching element Q2 is turned on during the period from time t5 through time t6, the switching element Q2 is brought into a zero-voltage switching operation and a zero-current switching operation.

During time t6 to time t7, because the switching element Q2 is turned on at time t6, a current flows through Vin, Q2, Lr1, Lp1 (P1), Cri to Vin, and the voltage VCri of the current resonance capacitor Cri increases. In addition, a current flows through S1, D3, Co1 to S1, whereas the current flows through Co1, Ro1 to Co1, on the secondary winding side of the transformer T1. The voltage of the secondary winding S1 is clamped by the output voltage Vo, whereas the voltage of the primary winding P1 is clamped by a voltage obtained by multiplying the output voltage Vo by the turns ratio. As a result, the resonance current generated by the reactor Lr1 and the current resonance capacitor Cri, flows on the primary winding side of the transformer T1.

During time t7 to time t8, the voltage of the secondary winding S1 decreases below the output voltage Vo at time t7. The current flows through Co1, Ro1 to Co1. In addition, the current flows through Vin, Q2, Lr1, Lp1, Cri to Vin, on the primary winding side of the transformer T1, while the resonance current generated by the sum (Lr1+Lp1) of the two reactors Lr1 and Lp1 as well as the current resonance capacitor Cri, flows on the primary winding side of the transformer T1.

As described above, the conventional DC-DC converter shown in FIG. 1 controls the switching frequencies respectively of the switching elements Q1 and the switching element Q2 by use of the pulse signal with a duty of approximately 50%. Thereby, the conventional DC-DC converter changes the resonance current generated by the reactor Lr1, the reactor Lp1 and the current resonance capacitor Cri, so as to control the output voltage Vo. As a result, when the switching frequencies are increased, the output voltage Vo is decreased.

Furthermore, as shown in FIG. 1, a capacitor input system is adopted for the output smoothing means of this circuit. For this reason, if the secondary winding side of the transformer T1 is configured with multiple outputs, a multiple-output voltage supply circuit can be easily configured by: providing secondary windings S13, S14 in addition to the existing secondary windings S11 and S12 in the transformer T1a as shown in FIG. 3; and rectifying and smoothing a voltage generated in the secondary windings S13 and S14. In addition, because the secondary windings S11 and S12 as well as the secondary windings S13 and S14 are tightly coupled with one another, each of the multiple-output voltages with multiple outputs is in proportion to its turns ratio, resulting in good performance of cross regulation.

Because the output voltage Vo on the secondary winding side of the transformer T1 is in proportion to its turns ratio on the secondary winding side thereof as described above, the larger the number of windings on the secondary winding side of the transformer T1 is, the more finely the output voltage can be set.

In the case of the conventional circuit, however, the currents ID3 and ID4 flowing in the respective diodes D3 and D4 on the secondary winding side of the transformer 1 are each shaped like a sine curve because of the resonance current generated by the resonant capacitor Cri and the reactor Lr1. These sine curved currents flow, as ripple currents, into the smoothing capacitor Co1. As a result, when the output currents are large, large ripple currents also flow into the smoothing capacitor Co1. For example, if the two output voltages on the secondary winding side are 5 volts with 10 amperes and 24 volts with 2.1 amperes each with an output capacitance of 50 watts, then the capacitor with an output of 5 volts has approximately 5 times larger ripple current flowing thereinto than the capacitor with an output of 24 volts.

Moreover, when the number of turns is increased for each secondary winding, the number of turns also needs to be increased for the primary winding. As a result, the use of the leakage inductance between the primary winding and the secondary windings of the transformer T1 for the reactor Lr1 constituting the resonance circuit causes the following problem.

Specifically, when the number of turns of the primary winding of the transformer T1 is increased, the leakage inductance increases in proportion to the square of the its number of turns. In addition, the electric power transmitted to the secondary winding side of the transformer T1 is in proportion to the square root of Cri/Lr1, and the operating frequency is in proportion to Cri×Lr1.

As a result, if the operating frequency is constant, the output electric power is in proportion to the voltage Vri of the current resonance capacitor Cri. If a voltage supply circuit with a large output capacitance is configured, the current resonance capacitor Cri needs to be increased. If the operating frequency is constant, the reactor Lr1 needs to be decreased with the increase of current resonance capacitor Cri. In order to decrease the reactor Lr1, the number of turns of the primary winding needs to be decreased. If the voltage supply circuit with a large output electric power is configured, then the number of turns needs to be decreased, thereby making it difficult to accurately select the turns ratio on the secondary winding side.

To deal with this problem, in the conventional circuit configuration, a voltage supply with high efficiency and low noise can be configured by using zero-voltage switching (ZVS) and zero-current switching (ZCS). Moreover, in the same manner, a voltage supply circuit with a multiple-output voltage supply on the secondary winding side can be configured.

However, if the multiple-output voltage supply circuit with a large total electric power on the secondary winding side is configured by using the leakage inductance between the primary winding and the secondary winding of the transformer T1 for the reactor Lr1, then this configuration generates large ripple currents flowing into the smoothing capacitor Co1 because the currents flowing into the smoothing capacitor Co1 are shaped like sine curves. In addition, the large output of output currents produces heat and increases the ripple voltage, due to the ESR (equivalent series resistance) of the smoothing capacitor Co1. In order to solve this problem, the capacitance of the smoothing capacitor Co1 is increased, or the number of smoothing capacitor Co1 is increased.

Nevertheless, these solutions also have problems that the cost is increased, and that a reduction of the number of turns for the secondary windings does not allow the turns ratio to be set accurately. As a result, there is still a problem that any current solutions cannot deal with a voltage supply circuit with multiple outputs having lower output voltages.

SUMMARY OF THE INVENTION

An object of the present invention is to provide a smaller-sized, lower-cost, and more highly-efficient DC-DC converter including a voltage supply circuit with multiple outputs having lower output voltages.

A first aspect of the present invention is a DC-DC converter including: a first transformer including a primary winding and a secondary winding; a first series circuit in which the primary winding of the first transformer, a first reactor, and a current resonance capacitor are connected to one another in series; a converting circuit configured to convert a DC-DC voltage outputted from a DC power supply into an AC voltage, and to output the AC voltage to the first series circuit; a second transformer including at least a primary winding and a secondary winding which are tightly coupled with one another; a third transformer including at least a primary winding and a secondary winding which are tightly coupled with one another; a closed loop circuit in which the primary winding of the second transformer, the primary winding of the third transformer, and a second reactor constitute a closed loop; a second series circuit in which the secondary winding of the second transformer and the secondary winding of the third transformer are connected in series to the both ends of secondary winding of the first transformer; a first rectifying/smoothing circuit configured to rectify and smooth a voltage generated in the secondary winding of the second transformer, and thus to produce a first DC output; and a second rectifying/smoothing circuit configured to rectify and smooth a voltage generated in the secondary winding of the third transformer, and thus configured to produce a second DC output.

A second aspect of the present invention is the DC-DC converter in which the first reactor is made of a leakage inductance between the primary winding and the secondary winding of the first transformer.

A third aspect of the present invention is a DC-DC converter including: a first transformer including a primary winding and a secondary winding; a first series circuit in which the primary winding of the first transformer, a first reactor, and a current resonance capacitor are connected to one another in series; a converting circuit for converting a DC-DC voltage outputted from a DC power supply into an AC voltage, and for outputting the resultant AC voltage to the first series circuit; a second transformer which includes a first secondary winding made of at least one tightly coupled winding and a second secondary winding made of at least one tightly coupled winging, and in which the first secondary winding and the second secondary winding are loosely-coupled with each other; a second series circuit in which the first secondary winding of the second transformer and the second secondary winding of the second transformer are connected to each other in series between both ends of the secondary winding of the first transformer; a first rectifying/smoothing circuit configured to rectify and smooth a voltage generated in the first secondary winding of the second transformer, and to produce a first DC output; and a second rectifying/smoothing circuit configured to rectify and smooth a voltage generated in the second secondary winding of the second transformer, and to produce a second DC output.

A fourth aspect of the present invention is the DC-DC converter in which the converting circuit includes: a first switching element, one end of which is connected to the negative electrode of the DC power supply; and a second switching element, one end of which is connected to the other end of the first switching element, and the other end of which is connected to the positive electrode of the DC power supply, and in which the DC-DC voltage outputted from the DC power supply is converted into the AC voltage by turning on and off the first switching element and the second switching element alternately, and the AC voltage is outputted to the first series circuit connected to the both ends of any one of the first switching element and the second switching element.

A fifth aspect of the present invention is the DC-DC converter in which the converting circuit includes: a first switching element, one end of which is connected to the negative electrode of the DC power supply; a second switching element, one end of which is connected to the other end of the first switching element, and the other end of which is connected to the positive electrode of the DC power supply; a third switching element, one end of which is connected to the negative electrode of the DC power supply; and a fourth switching element, one end of which is connected to the other end of the third switching element, and the other end of which is connected to the positive electrode of the DC power supply, and in which the DC-DC voltage outputted from the DC power supply is converted into the AC voltage by turning on and off a set of the first switching element and the fourth switching element as well as a set of the second switching element and the third switching element alternately, and the resultant AC voltage is outputted to the first series circuit connected to a connecting point between the first switching element and the second switching element as well as a connecting point between the third switching element and the fourth switching element.

A sixth aspect of the present invention is the DC-DC converter further including a control circuit in which an oscillation frequency is changed based on the first DC output outputted from the first rectifying/smoothing circuit, and thereby the first switching element and the second switching element are turned on and off alternately.

The present invention includes: the closed loop circuit constituted by the tightly coupled primary winding of the second transformer, the tightly coupled primary winding of the third transformer, and the second reactor; and a second series circuit in which the secondary windings of the second transformer and the secondary windings of the third transformer are connected in series to the both ends of the secondary winding of the first transformer. Thus, the present invention makes it possible to: cause the current flowing in each of the smoothing capacitors to be shaped like a rectangular wave; decrease each of the ripple currents flowing into each of the smoothing capacitors; reduce the capacity of each of the smoothing capacitors; and lessen the number of smoothing capacitors.

In addition, the relationship between the voltages respectively generated in the secondary windings of the first transformer and the output voltages is improved, as compared with that of the conventional circuit. As a result, the leakage inductance between the primary winding and the secondary winding of the first transformer can be used as the current resonance reactor. Thus, the present invention can provide a smaller-sized, lower-cost, and more highly-efficient DC-DC converter when the DC-DC converter includes a voltage supply circuit with multiple outputs having lower output voltages.

DESCRIPTION OF THE PREFERRED EMBODIMENT

Detailed descriptions will be provided hereinbelow for DC-DC converter s according to their embodiments of the present invention with reference to the drawings.

Embodiment 1

Figure 1:
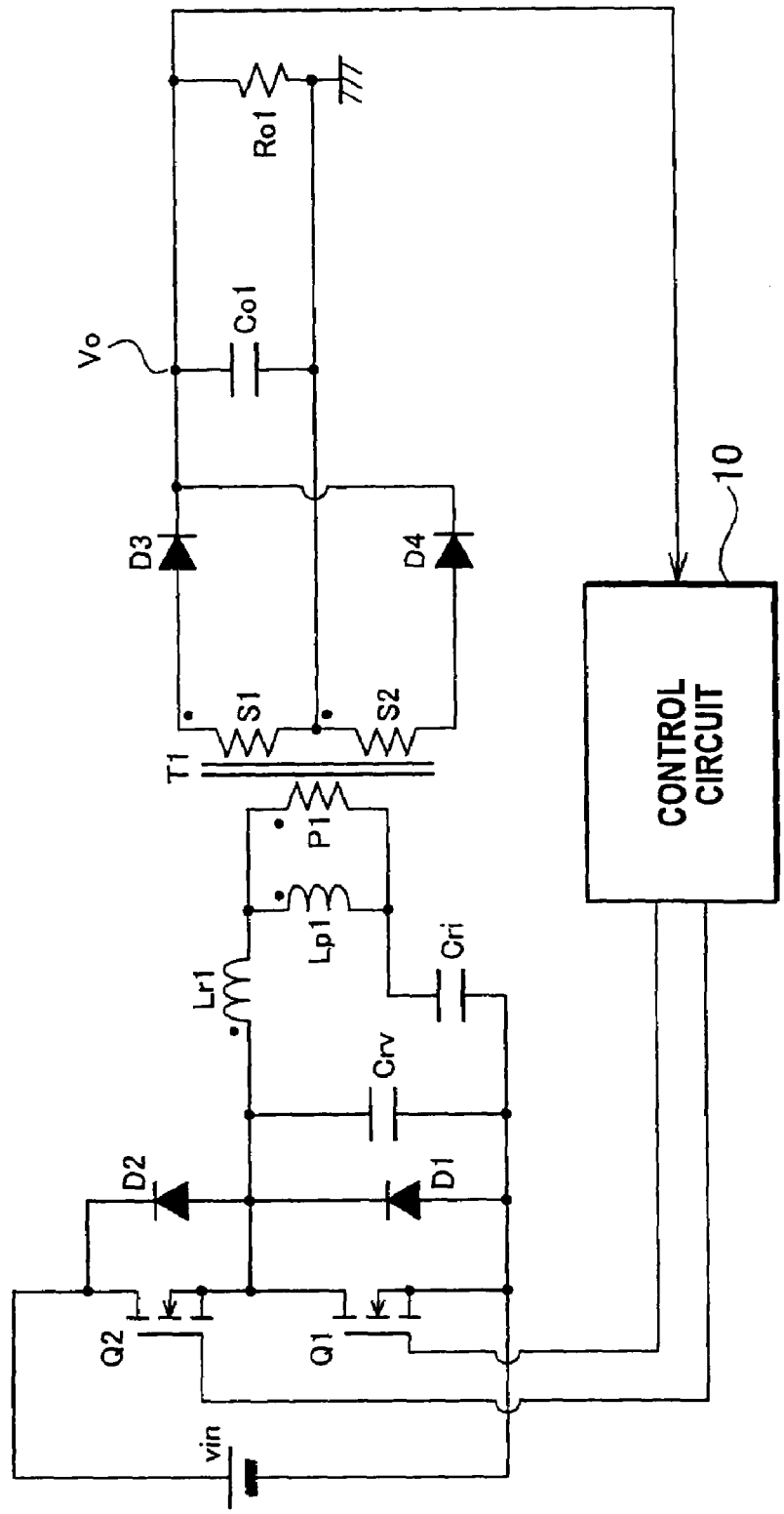
FIG. 1 is a circuit block diagram of a conventional single-output DC-DC converter.
Figure 4:
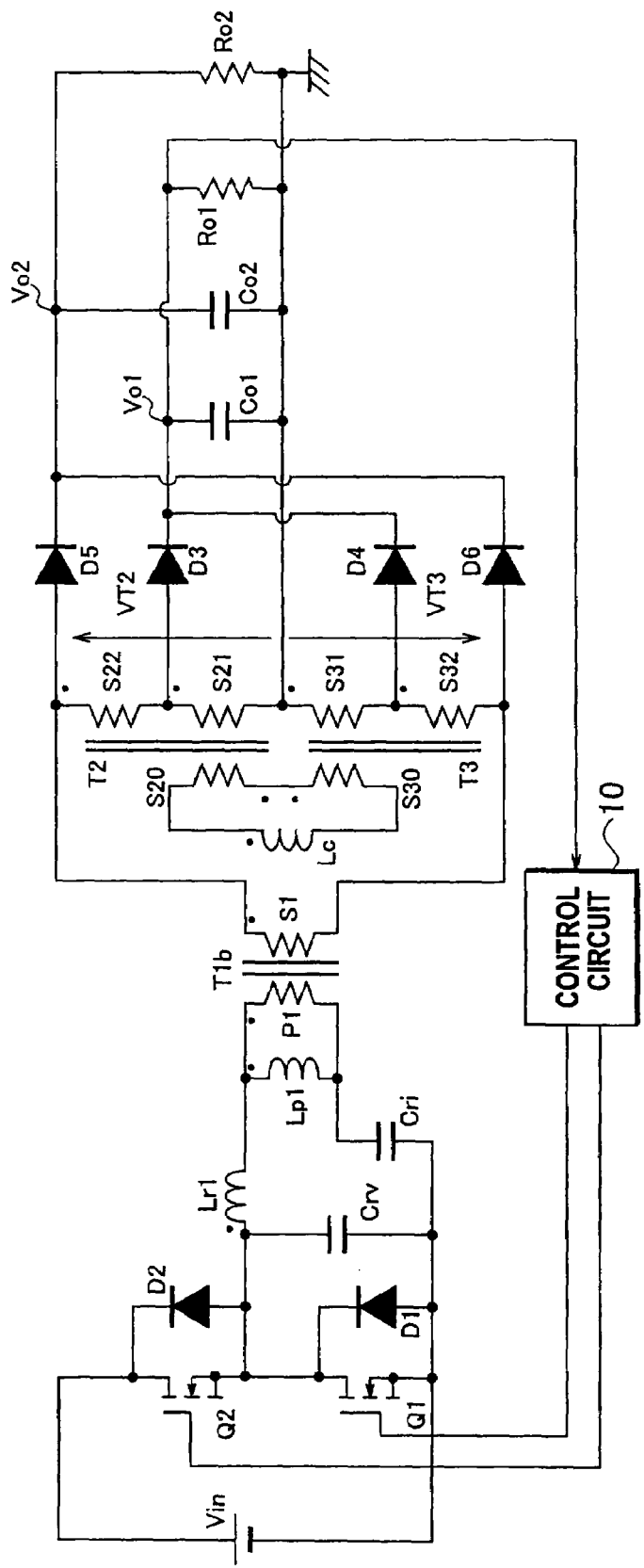
FIG. 4 is a circuit block diagram of a DC-DC converter according to embodiment 1 of the present invention.

FIG. 4 is a block diagram of a circuit of a DC-DC converter according to embodiment 1 of the present invention. Like the DC-DC converter shown in FIG. 1, the DC-DC converter shown in FIG. 4 is configured by use of a half-bridge circuit.

A transformer (a first transformer) T1$b$ includes a primary winding P1 and a secondary winding S1. Another transformer (a second transformer) T2 includes a coupled winding (a primary winding) S20 and transformer windings (secondary windings) S21 and S22, the three windings being tightly coupled with one another. Yet another transformer (a third transformer) T3 includes a coupled winding (a primary winding) S30 and transformer windings (secondary windings) S31 and S32, the three windings being tightly coupled with one another.

The turns ratio between the number n20 of turns of the coupled winding S20 and the number n30 of turns of the coupled winding S30 is 1:1. The turns ratio between the number n21 of turns of the transformer winding S21 and the number n31 of turns of the transformer winding S31 is 1:1. The ratio between the number n22 of turns of the transformer winding S22 and the number n32 of turns of the transformer winding S32 is 1:1. The turns ratio between the number n21 of turns of the transformer winding S21 and the number n22 of turns of the transformer winding S22 as well as the turns ratio between the number n31 of turns of the transformer S31 and the number n32 of turns of the transformer S32 is m:n, where m≠1 and n≠1.

A second series circuit in which the transformer windings S21 and S22 of the transformer T2 as well as the transformer windings S31 and S32 of the transformer T3 are connected to one another in series between the both ends of the secondary winding S21 of the transformer T1$b$. The coupled winding S20 of the transformer T2, the coupled winding S30 of the transformer T3, and a reactor Lc constitute a closed loop.

A first series circuit including the primary winding PI of the transformer T1$b$, a reactor (a first reactor) Lr1, and a current resonance capacitor Cri are provided in the DC-DC converter. The first series circuit and a voltage resonance capacitor Crv are connected between the drain terminal and source terminal of a switching element Q1 (a first switching element) made of a MOSFET (a metal oxide semiconductor field-effect transistor). Another switching element Q2 (a second switching element) made of a MOSFET and the switching element Q1 are connected to each other in series. The switching element Q1 and the switching element Q2 thus connected are connected to the both ends of a DC power supply Vin. A diode D1 is connected between the drain terminal and source terminal of the switching element Q1, whereas a diode D2 is connected between the drain terminal and source terminal of the switching element Q2.

It should be noted that the first series circuit and the voltage resonance capacitor Crv may be connected between the drain terminal and source terminal of the switching element Q2. In addition, a parasitic capacitance between the drain terminal and source terminal of the switching element Q1 may substitute for the diode D1, whereas a parasitic capacitance between the drain terminal and source terminal of the switching element Q2 may substitute for the diode D2. Furthermore, a parasitic capacitance between the drain terminal and source terminal of the switching element Q1 or the switching element Q2 may substitute for the voltage resonance capacitor Crv.

The reactor Lr1 is made of a leakage inductance between the primary winding and the secondary winding of the transformer T1$b$. An exciting inductance, as a reactor Lp1, is equivalently connected to the primary winding P1.

The switching elements Q1 and Q2 constitute a converting circuit. The converting circuit converts the DC-DC voltage outputted from the DC power supply Vin into an AC voltage by turning on and off the first switching element Q1 and the second switching element Q2 alternately, and thus applies the AC voltage to the primary winding P1 through the current resonance capacitor Cri connected to the source terminal of the switching element Q1. It should be noted that the current resonance capacitor Cri may be connected to the drain terminal of the switching element Q1.

The anode of a diode D3 is connected to one end (● side) of the output transformer winding S21 of the transformer T2. The other end of the transformer winding S21 of the transformer T2 and one end (● side) of the transformer winding S31 of the transformer T3 are each connected to one end of a smoothing capacitor Co1 and one end of a smoothing capacitor Co2. The other end of the transformer winding S31 of the transformer T3 and one end of the transformer winding S32 of the transformer T3 are each connected to the anode of the diode D4. The cathode of the diode D3 and the cathode of the diode D4 are connected to the other end of the capacitor Co1. A load Ro1 is connected to the both ends of the capacitor Co1. The diode D3, the diode D4 and the capacitor Co1 constitute a first rectifying/smoothing circuit configured to rectify and smooth a voltage (a first voltage) generated in the transformer windings S21 and S31, and thus to produce a first DC output Vo1.

The anode of a diode D5 is connected to one end (● side) of the output transformer winding S22 of the transformer T2. The other end of the transformer winding S22 of the transformer T2 is connected to the anode of the diode D3.

The other end of the transformer winding S32 of the transformer T3 is connected to the anode of a diode D6. The cathode of the diode D5 and the cathode of the diode D6 are each connected to the other end of the capacitor Co2. A load Ro2 is connected to the both ends of the capacitor Co2. The diode D5, the diode D6 and the capacitor Co2 constitute a second rectifying/smoothing circuit configured to rectify and smooth a voltage (a second voltage) generated in the transformer windings S22 and S32, and thus to produce a second DC output Vo2.

A control circuit 10 performs the pulse frequency modulation (PFM) control (the frequency control) of an output voltage Vo1 from the capacitor Co1 by alternately turning on and off the switching elements Q1 and Q2 based on the output voltage Vo1 from the capacitor Co1, so that the output voltage Vo1 of the capacitor Co1 can be kept at a constant value.

Description of Characteristics of Embodiment 1

Figure 3:
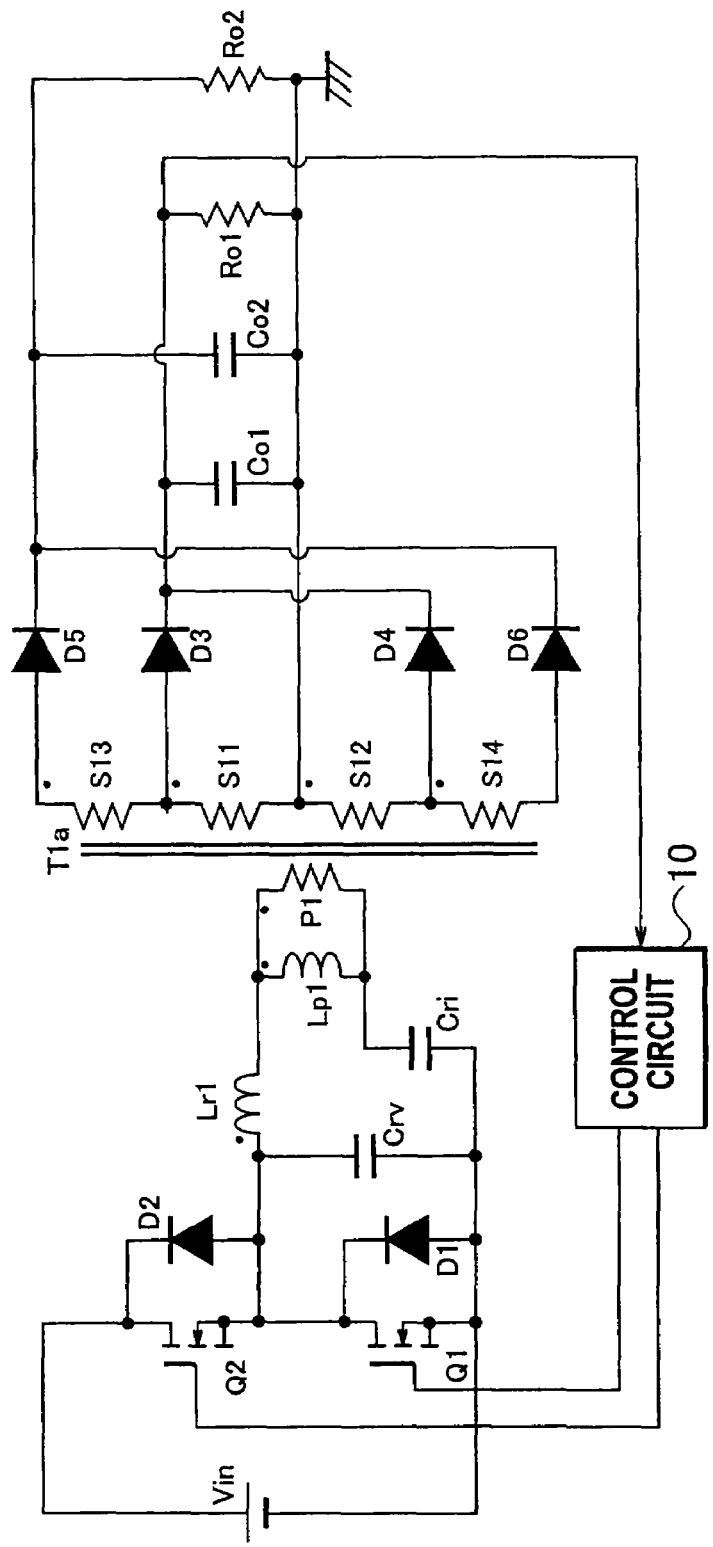
FIG. 3 is a circuit block diagram of a conventional multiple-output DC-DC converter.

Descriptions will be provided next for characteristics of the DC-DC converter according to embodiment 1. Unlike the transformer T1 in the circuit of the conventional DC-DC converter shown in FIG. 3, the transformer T1*b* as an insulation transformer in the circuit of the DC-DC converter according to embodiment 1 includes a secondary winding S1 which is configured by use of a single secondary winding circuit.

Figure 2:
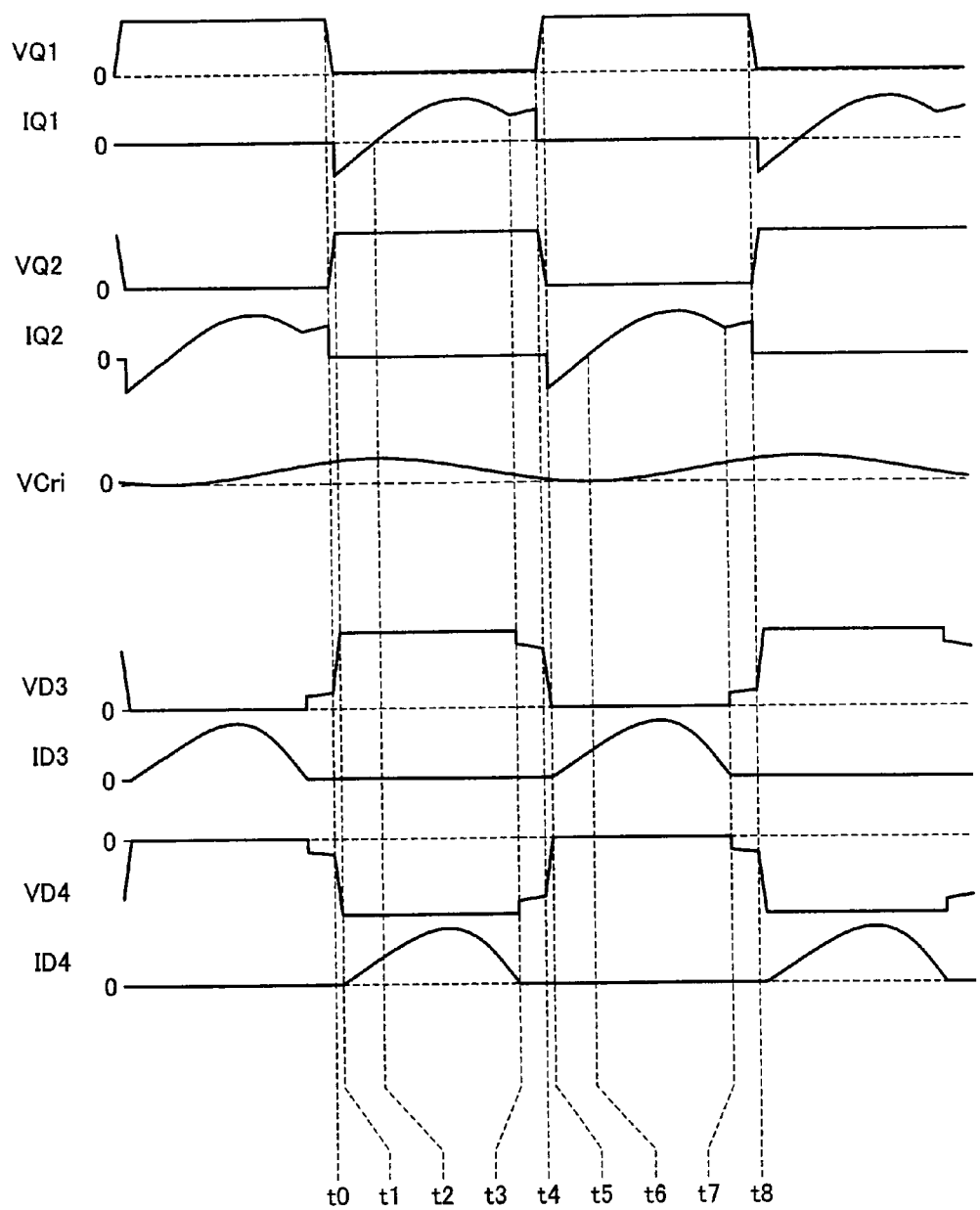
FIG. 2 is a timing chart showing signals in their respective parts of the conventional single-output DC-DC converter shown in FIG. 1.

In the case of the circuit of the conventional DC-DC converter, as shown in FIG. 2, a current flows in the secondary winding S11 while the switching element Q2 is turned on, whereas a current flows in the secondary winding S12 while the switching element Q2 is turned off.

Figure 5:
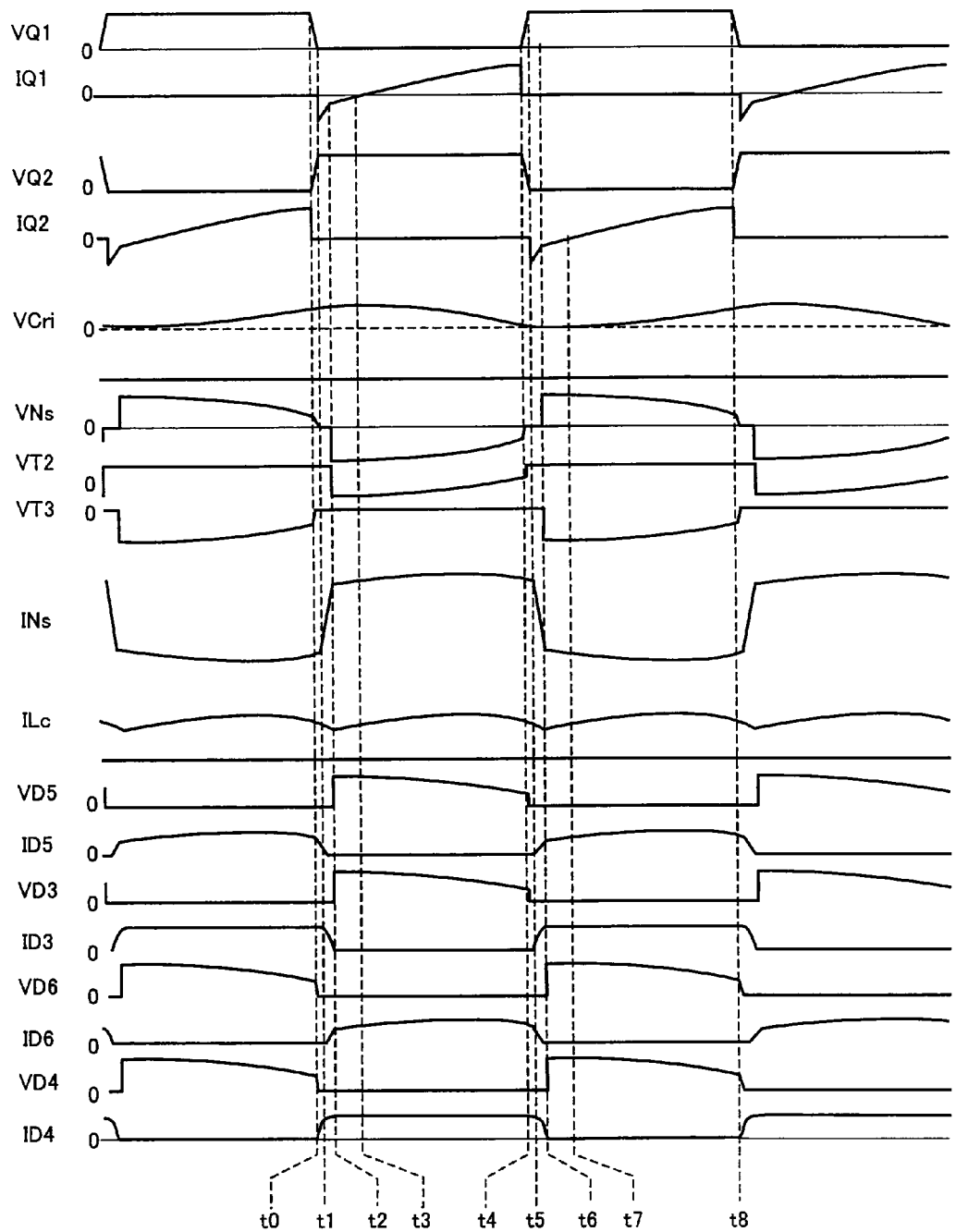
FIG. 5 is a timing chart showing signals in their respective parts in the DC-DC converter according to embodiment 1 of the present invention.

By contrast, in the case of embodiment 1, as shown in FIG. 5, an AC INs flows in the secondary winding S1 of the transformer T1*b*. As a result, the average current density of the secondary winding S1 according to embodiment 1 is equal to a half of the average current density of the conventional DC-DC converter.

Furthermore, in the conventional circuit, currents like the sine curve flow in the respective diodes D3 and D4. By contrast, in the embodiment 1, currents each shaped like the rectangular wave flow in the respective diodes D3 to D6. As a result, the ratio of an effective value of the current between the conventional case and the embodiment 1 is $1/\sqrt{2}$, as an effective value, thereby enabling a large reduction in loss.

Moreover, for example, if the ratio between the number of turns of the coupled winding S20 and the total number of turns of the transformer windings S21 and S22 is n20: (n21+n22)=1:1, then the switching element Q2 is in an ON state, whereas the switching element 1 is in an OFF state, during time t7 to time t8 shown in FIG. 5. In this state, the relationship between the current INs flowing in the secondary winding S1 and the current ID3 flowing in the diode D3, as well as the relationship between the voltage VNs generated in the secondary winding S1 and the output voltage Vo2 will be described. During time t7 to time t8, a positive voltage VNs is generated at the starting point (● side) of the secondary winding S1.

At this time, a current flows through S1, D5, Co2, S31, S32 to S1 on the secondary winding side of the transformer T1*b*. As a result, the total voltage VT3 of a voltage between the both ends of the transformer winding S31 and a voltage between the both ends of the transformer winding S32 is expressed by $$VT3 = VNs - Vo2.$$

The transformer T2 and the transformer T3 are connected to each other by connecting the coupled windings S20 and S30 to each other with the reactor Lc interposed therebetween. For this reason, a current flowing in the transformer windings S31 and S32 of the transformer T3 flows into the coupled winding S20 of the transformer T2 through the coupled winding S30 of the transformer T3, and then flows into the transformer windings S21 and S22 of the transformer T2. As a result, a current flows through S30, S20, Lc to S30, whereas the other current flows through S21, S22, D5, Co2 to S21. For this reason, a current which is twice as large as that flowing in the secondary winding S1 flows in the diode D5.

In addition, a voltage VT2 generated in the transformer windings S21 and S22 of the transformer T2 is equal to the output voltage Vo2. As a result, a voltage VLc applied to the reactor Lc is expressed by $$VLc = VT3 - VT2 = (VNs - Vo2) - Vo2 = VNs - 2 \cdot Vo2.$$

Consequently, the relationship between the voltage generated in the secondary winding S1 (the number of turns: Ns) and the output voltage Vo2 is expressed by $$VNs = 2 \cdot Vo2 + VLc.$$

For this reason, the voltage VNs generated in the secondary winding S1 is more than twice as large as the output voltage Vo2 of the secondary winding side. Thus, as compared with the conventional case, the secondary winding S1 can produce a low voltage output by obtaining the number of turns which is more than twice as large as the conventional one.

During time t2 to time t3, time t3 to time t4, time t6 to time t7, and time t7 to time t8, a voltage expressed by $$VLc = VNs - 2 \cdot Vo2$$

is applied to the reactor Lc. A current ILc flows in the reactor Lc while restricted by a reactor value. In addition, currents flowing in the respective diodes D3 to D6 are restricted by the reactor Lc, and are accordingly each shaped like the almost rectangular wave with no peak as shown in FIG. 5.

This greatly reduces the ripple currents flowing into each of the smoothing capacitors Co1 and Co2. Thus, this reduction makes it possible to reduce the capacitances of the respective smoothing capacitors and the number of smoothing capacitors in the large-current outputting circuit.

To put it the other way, during this period, a resonance current flows due to the current resonance capacitor Cri as well as a reactor obtained by combining the reactor Lr1 and a primary winding side equivalent of the reactor Lc. Moreover, the cross regulation among the each of multiple output voltages exhibits a very good performance, because the cross regulation among the multiple outputs depends on the tightly coupled transformer windings S21, S22, S31 and S32.

Descriptions will be provided next for how the DC-DC converter thus configured according to embodiment 1 operates, with reference to the timing chart shown in FIG. 5.

During time t0 to time t1, the switching element Q2 turns off, from on, at time t0. While the switching element Q2 is turned on, a current flows through Vin, Q2, Lr1, lp1, Cri to Vin on the primary winding side of the transformer T1*b*. On the secondary winding side of the transformer T1*b*, a current flows through Co1, Ro1 to Co1, and another current flows through Co2, Ro2 to Co2.

In addition, yet another current flows through S1, D5, Co2, S31, S32 to S1. An amount of a current flowing in the transformer windings S31 and S32 of the transformer T3 is equal to an amount of a current flowing in the coupled winding S30 in the path through S30, S20, Lc to S30. As a result, a current ILc restricted by the reactor Lc flows.

Still another current flows in the transformer windings S21 and S22 of the transformer T2 by a current flows through S30, S20, Lc to S30. Specifically, a current flows through S21, S22, D5, Co2 to S21.

Furthermore, a voltage VT2 applied to the transformer windings S21 and S22 to generate a voltage expressed by $$VT2 \cdot n21/(n22+n21)$$

in the transformer winding S21 of the transformer T2. This causes a current to flow through S21, D3, Co1 to S21.

Once the switching element Q2 turns off, the current flowing in the primary winding side of the transformer T1 is commutated from the switching element Q2 to the voltage resonance capacitor Crv. As a result, a current flows through Crv, Lr1, Lp1, Cri to Crv.

As a result, the voltage of the voltage resonance capacitor Crv which is almost equal to the voltage of the DC power supply Vin while the switching element Q2 is turned on is discharged down to zero volts. Hereinafter, the voltage of the DC power supply will also be denoted by the reference numeral Vin.

Because the voltage of the voltage resonance capacitor Crv is equal to the voltage VQ1 of the switching element Q1, the voltage VQ1 of the switching element Q1 accordingly decreases from Vin to zero volts. In addition, because the voltage VQ2 of the switching element Q2 is expressed by (Vin−VQ1), the voltage VQ2 increases from zero volts to Vin.

During time t1 to time t2, once the voltage of the voltage resonance capacitor Crv decreases to zero volts at time t1, the diode D1 becomes conductive, and the current thus flows through D1, Lr1, Lp1, Cri to D1. Furthermore, during time t1 to time t2, one current is in the process of being commutated from the path through Si, D5, Co2, S31, S32 to S1 and a path through S1, D6, Co2, S21, S22 to S1, whereas the other current is in the process of being commutated from the path through S21, S22, D5, Co2 to S21 and a path through S31, S32, D6, Co2 to S31. To put it the other way, during time t1 to time t2, the current ID5 flowing through the diode D5 is in the process of being replaced with a current ID6 flowing through the diode D6. As a result, the voltage between the both ends of the secondary winding S1 becomes equal to zero volts because both the current ID5 flowing out of the diode D5 and the current ID6 flowing out of the diode D6 flow into the secondary winding S1.

At time t2, the current ID5 flowing through the diode D5 is all replaced with the current ID6 flowing through the diode D6. In addition, the current ID3 flowing through S21, D3, Co1 to S21 is similarly replaced with a current flowing through the diode D4.

During time t2 to time t3, a current flows through Lr1, Lp1, Cri, D1 to Lr1 on the primary winding side of the transformer T1b. On the secondary winding side of the transformer T1b, one current flows through S1, D6, Co2, S21, S22 to S1 whereas the other current flows through S31, S32, D6, Co2 to S31.

In addition, the current flowing through the transformer windings S21 and S22 of the transformer T2 is as large as the current flowing through the coupled winding S20 in the path through S20, Lc, S30 to S20. As a result, a current ILc restricted by the reactor Lc flows through the transformer windings S21 and S22.

Furthermore, a current which is as large as the current flowing through S20, Lc, S30 to S20 flows through the transformer windings S31 and S32 of the transformer T3 as well. For this reason, another current which is as large as the current flowing in the path through S20, Lc, S30 to S20 flows through S31, S32, D6, Co2 to S31. Moreover, the voltage VT3 applied to the transformer windings S31 and S32 of the transformer T3 generates a voltage expressed by $$VT3 \cdot n31/(n32+n31)$$

in the transformer winding S31 of the transformer T3. This causes a current to flow through S31, D4, Co1 to S31.

Moreover, when the gate terminal signal of the switching element Q1 is turned on during time t0 to time t2, the switching element Q1 is brought into a zero-voltage switching (ZVS) operation and a zero-current switching (ZCS) operation.

During time t3 to time t4, a current flows through Cri, Lp1, Lr1, Q1 to Cri on the primary winding side of the transformer T1b, because the switching element Q1 is turned on. On the secondary winding side of the transformer T1b, the currents flow during time t3 to time t4 in the same manner as the currents flow during the time t2 to time t3.

During time t4 to time t5, when the switching element Q1 turns off, the current flowing on the primary winding side of the transformer T1b is commutated from the switching element Q1 to the voltage resonance capacitor Crv, and the current flows through Lr1, Crv, Cri, Lp1 to Lr1.

As a result, the voltage resonance capacitor Crv whose voltage is almost equal to zero volts while the switching element Q1 is turned on, is charged up to Vin. Consequently, the voltage VQ1 of the switching element Q1 increases from zero volts to Vin, because the voltage of the voltage resonance capacitor Crv is equal to the voltage VQ1 of the switching element Q1. In addition, the voltage VQ2 of the switching element Q2 decreases from Vin to zero volts, because the voltage VQ2 of the switching element Q2 is expressed by $$Vin-VQ1.$$

During time t5 to time t6, once the voltage of the voltage resonance capacitor Crv increases to Vin at time t5, the diode D2 becomes conductive, and a current flows through Lr1, D2, Vin, Cri, Lp1 to Lr1. In addition, in the same period, one current is in the process of being commutated from the path through S1, D6, Co2, S21, S22 to S1 to the path through S1, D5, Co2, S31, S32 to S1, whereas the other current is in the process of being commutated from the path through S31, S32, D6, Co2 to S31 to the path through S21, S22, D5, Co2 to S21. To put it the other way, the current ID6 flowing through the diode D6 is in the process of being replaced with the current ID5 flowing through the diode D5.

Consequently, the voltage between the both ends of the secondary winding S1 becomes equal to zero volts, because the current ID6 of the diode D6 and the current ID5 of the diode D5 flow into the secondary winding S1. At time t6, the current ID6 flowing through the diode D6 is all replaced with the current ID5 flowing through the diode D5. In addition, the current ID4 flowing through S31, D4, Co1 to S31 is similarly replaced with a current flowing through the diode D3.

During time t6 to time t7, a current flows through Lr1, D2 (Q2), Vin, Cri, Lp1 to Lr1 on the primary winding side of the transformer T1b. On the secondary winding side of the transformer T1b, one current flows through S1, D5, Co2, S31, S32 to S1, whereas the other current flows through S21, S22, D5, Co2 to S21.

In addition, the current flowing through the transformer windings S31 and S32 of the transformer T3 is as large as the current flowing through the coupled winding S30 in the middle of the path through S30, S20 Lc to S30. As a result, a current ILc restricted by the reactor Lc flows through the transformer windings S31 and S32.

Furthermore, a current which is as large as the current flowing through S30, S20, Lc to S30 flows through the transformer windings S21 and S22 of the transformer T2 as well. For this reason, another current which is as large as the current flowing in the path through S30, S20, Lc to S30 flows through S21, S22, D5, Co2 to S21. Moreover, the voltage VT2 applied to the transformer windings S21 and S22 of the transformer T3 generates a voltage expressed by $$VT2 \cdot n21/(n22+n21)$$

in the transformer winding S21 of the transformer T2. This causes a current to flows through S21, D3, Co1 to S21.

Moreover, when the gate terminal signal of the switching element Q2 is turned on during time t5 to time t7, the switching element Q2 is brought into a zero-voltage switching (ZVS) operation and a zero-current switching (ZCS) operation.

During time t7 to time t8, a current flows through Vin, Q2, Lr1, Lp1, Cri to Vin on the primary winding side of the transformer T1b, because the switching element Q2 is turned on. On the secondary winding side of the transformer T1b, the currents flow during time t7 to time t8 in the same manner as the currents flow during the time t6 to time t7.

Embodiment 2

Figure 6A:
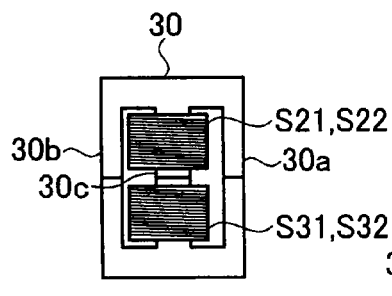
FIGS. 6A to 6C are diagrams respectively showing winding structures of a transformer in a DC-DC converter according to embodiment 2 of the present invention.
Figure 6B:
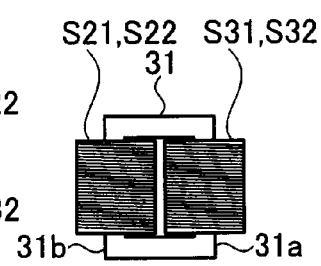
Figure 6C:
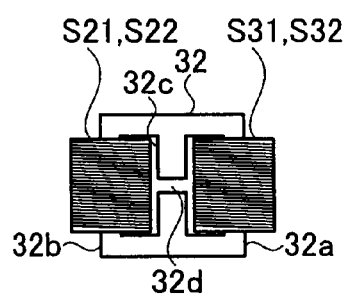

FIGS. 6A to 6C are diagrams respectively showing winding structures of a transformer in the DC-DC converter according to embodiment 2 of the present invention. In the case of embodiment 2, the DC-DC converter can be configured with a transformer which is obtained by integrating the second transformer T2, the third transformer T3, and the reactor Lc shown in FIG. 4, and which has any one of the structures shown in FIGS. 6A to 6C. Descriptions will be provided hereinbelow for the transformer thus obtained by the integration.

The transformer shown in FIG. 6A includes a core 30 which has two side legs 30a and 30b as well as a center leg 30c, and which is shaped like a mirror E-shape. The tightly coupled transformer windings S21 and S22 as well as the tightly coupled transformer windings S31 and S32 are wound around the center leg 30c with the tightly coupled transformer windings S21 and S22 being separated from the tightly coupled transformer windings S31 and S32 at a predetermined distance. Thereby, the transformer windings S21 and S22 are loose-coupled with the transformer windings S31 and s32.

The transformer shown in FIG. 6B includes a core 31 which has side legs 31a and 31b, and which is shaped like a square. The tightly coupled transformer windings S21 and S22 are wound around the leg 31b, whereas the tightly coupled transformer windings S31 and S32 are wound around the leg 31a. The transformer windings S21 and S22 are loose-coupled with the transformer windings S31 and S32.

The transformer shown in FIG. 6C includes a core 32 which has two side legs 32a and 32b as well as a center leg 32c, which is shaped like a mirror E-shape. The tightly coupled transformer windings S21 and S22 are wound around the leg 32b, whereas the tightly coupled transformer windings S31 and S32 are wound around the leg 32a. Thereby, the transformer windings S21 and S22 are loose-coupled with the transformer windings S31 and S32. A gap 32d is formed in the center leg 32c.

Figure 7A:
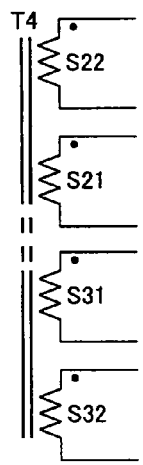
FIGS. 7A to 7C are respectively a circuit diagram of a transformer in the DC-DC converter according to embodiment 2 of the present invention, and diagrams showing equivalent circuits of the converter.
Figure 7B:
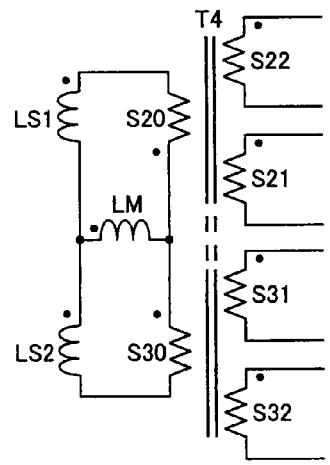
Figure 7C:
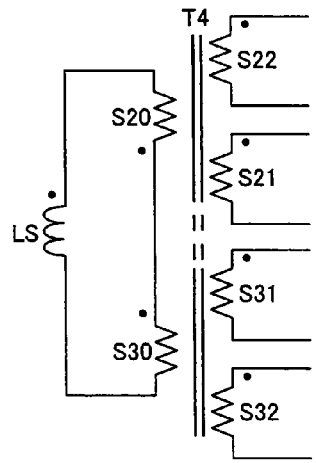

FIGS. 7A to 7C are respectively a circuit diagram of a transformer in the DC-DC converter according to embodiment 2 of the present invention, and diagrams showing equivalent circuits of the converter. FIG. 7A is a circuit diagram of a transformer T4, and FIG. 7B is a diagram showing an equivalent circuit of the transformer T4. The transformer T4 is formed by loose-coupling the transformer windings S21 and S22 with the transformer windings S31 and S32. Short reference symbol ==, which are shown in FIGS. 7A to 7C, denotes the loose-coupling of the transformer windings S21 and S22 with the transformer windings S31 and S32.

The tightly coupled transformer windings S21 and S22 as well as the tightly coupled transformer windings S31 and S32 are wound in the transformer T4 in order that the tightly coupled transformer windings S21 and S22 are loose-coupled with the tightly coupled transformer windings S31 and S32. For this reason, the leakage inductance between the coupled winding S20 and the transformer windings S21 and S22 is denoted by LS1, whereas the leakage inductance between the coupled winding S30 and the transformer windings S31 and S32 is denoted by LS2. In addition, the inductance obtained by combining the two leakage inductances is denoted by LM. In general, the value of the inductance LM is larger than the values respectively of the inductances LS1 and LS2. Accordingly, the equivalent circuit of the transformer T4 is as shown in FIG. 7C.

As a result, the equivalent circuit of the transformer T4 shown in FIG. 7C is the same as the combination of the transformer T2 and the transformer T3 shown in FIG. 4. In other words, the transformer T2, the transformer T3 and the reactor Lc shown in FIG. 4 can be formed by use of the transformer T4 obtained by integrating the transformer T2, the transformer T3 and the reactor Lc. This makes it possible to largely reduce the number of parts.

Figure 8:
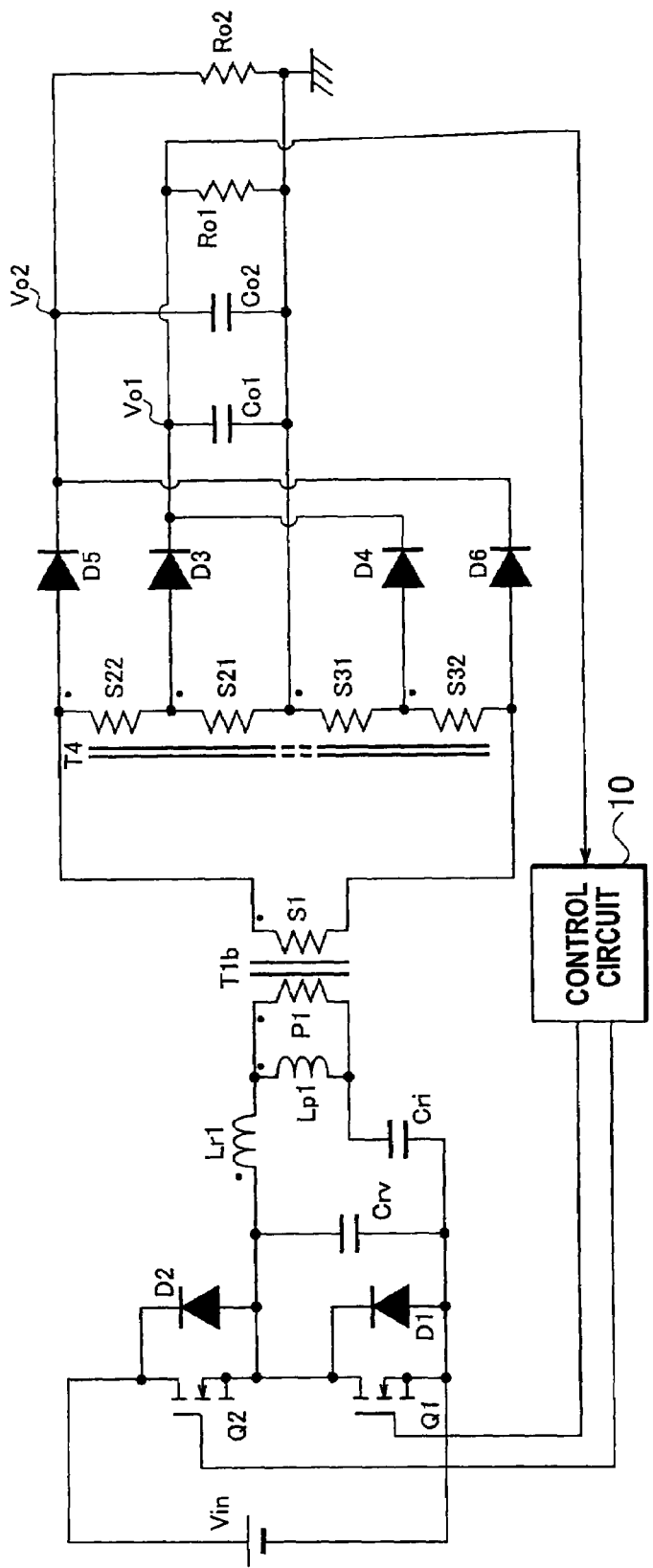
FIG. 8 is a circuit block diagram of the DC-DC converter according to embodiment 2 of the present invention.

FIG. 8 is a circuit diagram of the DC-DC converter according to embodiment 2 which is configured by use of the transformer T4 having the configuration shown in FIG. 6. It should be noted that: the DC-DC converter according to embodiment 2 operates in the same manner as the DC-DC converter according to embodiment 1 which has been described with reference to FIGS. 4 and 5; and the DC-DC converter according to embodiment 2 brings about the same effect as the DC-DC converter according to embodiment 1.

Embodiment 3

Figure 9:
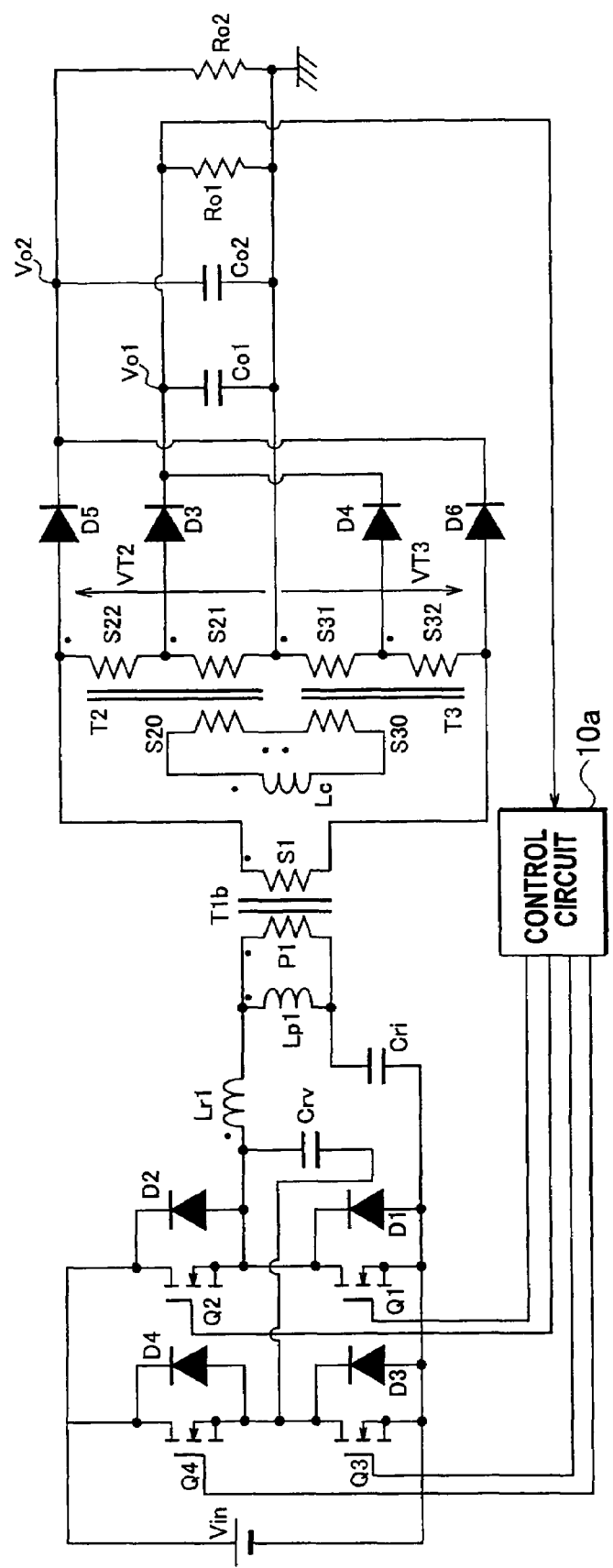
FIG. 9 is a circuit block diagram of a DC-DC converter according to embodiment 3 of the present invention.

FIG. 9 is a circuit diagram of a DC-DC converter according to embodiment 3 of the present invention. The DC-DC converter shown in FIG. 9 is characterized in that the DC-DC converter is configured by use of a full-bridge circuit. Specifically, the DC-DC converter according to embodiment is provided with the switching elements Q3 and Q4 in addition to the switching elements Q1 and Q2 included in the half-bridge circuit shown in FIG. 4. The both ends of the DC power supply Vin are connected in series to the switching element Q3 and the switching element Q4 in the circuit.

One end of the voltage resonance capacitor Crv is connected to the connecting point between the switching element Q1 and the switching element Q2, whereas the other end of the voltage resonance capacitor Crv is connected to the connecting point between the switching element Q3 and the switching element Q4.

A control circuit 10a turns on and off a set of the switching element Q1 and the switching element Q4 as well as a set of the switching element Q2 and the switching element S3 alternately, and thus converts the DC-DC voltage outputted from the DC power supply Vin into an alternating voltage, hence outputting the alternating voltage to the voltage resonance capacitor Crv.

The DC-DC converter according to embodiment 3 with the full-bridge configuration brings about the same effect as the DC-DC converter according to embodiment 1 brings about.

It should be noted that the present invention are not limited to the foregoing embodiments. Embodiment 3 shown in FIG. 9 illustrates the DC-DC converter in which the full-bridge circuit is configured by use of the transformer T2 and the transformer T3. For example, even if the DC-DC converter which uses the transformer T4 obtained by integrating the transformer T2 and the transformer T3 according to embodiment 2 shown in FIG. 8, is replaced with the full-bridge circuit, the DC-DC converter brings about the same effect as the DC-DC converter according to embodiment 3.

The present invention is applicable to a voltage supply circuit of a DC-DC converter type and a voltage supply circuit of an AC-DC converter type.

What is claimed is:

1. A DC-DC converter comprising:
   a first transformer including a primary winding and a secondary winding;
   a first series circuit in which the primary winding of the first transformer, a first reactor, and a current resonance capacitor are connected to one another in series;
   a converting circuit configured to convert a DC-DC voltage outputted from a DC power supply into an AC voltage, and to output the AC voltage to the first series circuit;
   a second transformer including at least a primary winding and a secondary winding which are tightly coupled with one another;
   a third transformer including at least a primary winding and a secondary winding which are tightly coupled with one another;
   a closed loop circuit in which the primary winding of the second transformer, the primary winding of the third transformer, and a second reactor constitute a closed loop;
   a second series circuit in which the secondary winding of the second transformer and the secondary winding of the third transformer are connected in series to both ends of the secondary winding of the first transformer;
   a first rectifying/smoothing circuit configured to rectify and smooth a voltage generated in the secondary winding of the second transformer, and to produce a first DC output; and
   a second rectifying/smoothing circuit configured to rectify and smooth a voltage generated in the secondary winding of the third transformer, and to produce a second DC output.

2. The DC-DC converter according to claim 1, wherein the first reactor is made of a leakage inductance between the primary winding and the secondary winding of the first transformer.

3. The DC-DC converter according to claim 1,
   wherein the converting circuit includes:
   a first switching element, one end of which is connected to a negative electrode of the DC power supply; and
   a second switching element, one end of which is connected to the other end of the first switching element, and the other end of which is connected to a positive electrode of the DC power supply, and
   wherein the DC-DC voltage outputted from the DC power supply is converted into the AC voltage by turning on and off the first switching element and the second switching element alternately, and the AC voltage is outputted to the first series circuit connected to the both ends of any one of the first switching element and the second switching element.

4. The DC-DC converter according to claim 1, wherein the converting circuit includes:
   a first switching element, one end of which is connected to a negative electrode of the DC power supply;
   a second switching element, one end of which is connected to the other end of the first switching element, and the other end of which is connected to a positive electrode of the DC power supply;
   a third switching element, one end of which is connected to the negative electrode of the DC power supply; and
   a fourth switching element, one end of which is connected to the other end of the third switching element, and the other end of which is connected to the positive electrode of the DC power supply, and
   wherein the DC-DC voltage outputted from the DC power supply is converted into the AC voltage by turning on and off alternately a set of the first switching element and the fourth switching element, and a set of the second switching element and the third switching element, and the AC voltage is outputted to the first series circuit connected to a connecting point between the first switching element and the second switching element as well as a connecting point between the third switching element and the fourth switching element.

5. The DC-DC converter according to claim 1, further comprising a control circuit in which an oscillation frequency is changed based on the first DC output outputted from the first rectifying/smoothing circuit, and thereby the first switching element and the second switching element are turned on and off alternately.

6. A DC-DC converter comprising:
   a first transformer including a primary winding and a secondary winding;
   a first series circuit in which the primary winding of the first transformer, a first reactor, and a current resonance capacitor are connected to one another in series;
   a converting circuit configured to convert a DC-DC voltage outputted from a DC power supply into an AC voltage, and for outputting the AC voltage to the first series circuit;
   a second transformer which includes a first secondary winding made of at least one tightly coupled winding and a second secondary winding made of at least one tightly coupled winging, and in which the first secondary winding and the second secondary winding are loosely-coupled with each other;
   a second series circuit in which the first secondary winding of the second transformer and the second secondary winding of the second transformer are connected in series to both ends of the secondary winding of the first transformer;
   a first rectifying/smoothing circuit configured to rectify and smooth a voltage generated in the first secondary winding of the second transformer, and to produce a first DC output; and a second rectifying/smoothing circuit configured to rectify and smooth a voltage generated in the second secondary winding of the second transformer, and to produce a second DC output.

7. The DC-DC converter according to claim 6, wherein the first reactor is made of a leakage inductance between the primary winding and the secondary winding of the first transformer.

8. The DC-DC converter according to claim 6, wherein the converting circuit includes:

a first switching element, one end of which is connected to a negative electrode of the DC power supply; and a second switching element, one end of which is connected to the other end of the first switching element, and the other end of which is connected to a positive electrode of the DC power supply, and wherein the DC-DC voltage outputted from the DC power supply is converted into the AC voltage by turning on and off the first switching element and the second switching element alternately, and the AC voltage is outputted to the first series circuit connected to the both ends of any one of the first switching element and the second switching element.

9. The DC-DC converter according to claim 6, wherein the converting circuit includes:

a first switching element, one end of which is connected to a negative electrode of the DC power supply;

a second switching element, one end of which is connected to the other end of the first switching element, and the other end of which is connected to a positive electrode of the DC power supply;

a third switching element, one end of which is connected to the negative electrode of the DC power supply; and a fourth switching element, one end of which is connected to the other end of the third switching element, and the other end of which is connected to the positive electrode of the DC power supply, and wherein the DC-DC voltage outputted from the DC power supply is converted into the AC voltage by turning on and off a set of the first switching element and the fourth switching element as well as a set of the second switching element and the third switching element alternately, and the AC voltage is outputted to the first series circuit connected to a connecting point between the first switching element and the second switching element as well as a connecting point between the third switching element and the fourth switching element.

10. The DC-DC converter according to claim 6, further comprising a control circuit in which an oscillation frequency is changed based on the first DC output outputted from the first rectifying/smoothing circuit, and thereby the first switching element and the second switching element are turned on and off alternately.

* * * * *